(12) United States Patent
Chamberlin (10) Patent No.: US 9,037,344 B2
(45) Date of Patent: May 19, 2015

(54) SYSTEM AND METHOD FOR DISPLAY OF INFORMATION USING A VEHICLE-MOUNT COMPUTER

(71) Applicant: Hand Held Products, Inc., Fort Mill, SC (US)

(72) Inventor: James Chamberlin, Tucker, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/902,144

(22) Filed: May 24, 2013

(65) Prior Publication Data

US 2014/0350783 A1     Nov. 27, 2014

(51) Int. Cl.
*B60R 1/00*     (2006.01)
*B60K 37/06*     (2006.01)

(52) U.S. Cl.
CPC ........... *B60R 1/00* (2013.01); *B60K 2350/1028* (2013.01); *B60K 37/06* (2013.01)

(58) Field of Classification Search
None
See application file for complete search history.

(56) References Cited

U.S. PATENT DOCUMENTS

| | | | |
|---|---|---|---|
| 4,821,029 A * | 4/1989 | Logan et al. | 345/173 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,567,861 B2 * | 7/2009 | Inagaki | 701/1 |
| 7,640,101 B2 * | 12/2009 | Pair et al. | 701/431 |
| 7,726,575 B2 | 6/2010 | Wang et al. | |
| 7,983,840 B2 * | 7/2011 | Pair et al. | 701/457 |
| 8,078,359 B2 * | 12/2011 | Small et al. | 701/36 |
| 8,294,969 B2 | 10/2012 | Plesko | |
| 8,317,105 B2 | 11/2012 | Kotlarsky et al. | |
| 8,322,622 B2 | 12/2012 | Liu | |

(Continued)

FOREIGN PATENT DOCUMENTS

| | | |
|---|---|---|
| GB | 2398050 A | 8/2004 |
| GB | 2490059 A | 10/2012 |

(Continued)

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Michael J Zanelli
(74) *Attorney, Agent, or Firm* — Additon, Higgins & Pendleton, P.A.

(57) ABSTRACT

A system and method display information using a vehicle-mount computer. The system includes: (i) a computer touch screen for inputting and displaying information; (ii) a motion detector for detecting vehicle motion; and (iii) a vehicle-mount computer in communication with the computer touch screen and the motion detector. The vehicle-mount computer includes a central processing unit and memory. The vehicle-mount computer's central processing unit is configured to store information associated with user-selected information from the computer touch screen. Further, the vehicle-mount computer's central processing unit is configured to receive vehicle-motion information from the motion detector. Moreover, the vehicle-mount computer's central processing unit is configured to control the display of a zoomed view of the user-selected information on the computer touch screen in response to the motion detector's detection of motion.

15 Claims, 3 Drawing Sheets

(56) References Cited

U.S. PATENT DOCUMENTS

| | | |
|---|---|---|
| 8,346,426 B1 | 1/2013 | Szybalski et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0001614 A1 | 1/2011 | Ghneim |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0242687 A1 | 9/2012 | Choi |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |

(56) References Cited

U.S. PATENT DOCUMENTS

| | | |
|---|---|---|
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014058087 A1 | 4/2014 |

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

(56) References Cited

OTHER PUBLICATIONS

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via Nfc Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

Great Britain Search and Exam Report in Application GB1408963.1; Dated Dec. 3, 2014; 8 pages.

\* cited by examiner

SYSTEM AND METHOD FOR DISPLAY OF INFORMATION USING A VEHICLE-MOUNT COMPUTER

FIELD OF THE INVENTION

The present invention relates generally to computer systems, and, more specifically, to systems and methods for displaying information using a vehicle-mount computer during vehicle motion.

BACKGROUND

Businesses have achieved greater productivity in recent years by deploying mobile computing devices into the field to assist workers. For example, workers use vehicle-mount computers to display important information in the field. Vehicle-mount computers are computing devices that are specially designed to mount to a vehicle and be used by the vehicle operator. For instance, several types of vehicle-mount computers are available for installation and use in commercial vehicles including forklifts, warehouse vehicles, and delivery trucks and vans.

Vehicle-mount computer systems typically utilize a screen for displaying information to a vehicle operator or other occupant. The computer system may incorporate a touch screen, or other input device, so that the user can select desired information for display. A forklift operator may, for example, view inventory information, delivery location information, and delivery navigation information directly from the cabin of the forklift using a vehicle-mount computer. The various types of user-selected information may be displayed either individually on the full area of a vehicle-mount computer screen or simultaneously on the computer screen using split-screen or otherwise partitioned views.

Although businesses have effectively employed vehicle-mount computers to increase worker productivity and improve the inbound, internal, and outbound flow of resources, challenges exist relating to the display of information on vehicle-mount computer screens when a vehicle is in motion. When a vehicle is in motion, the information displayed must be easily read by the vehicle operator at a glance and, therefore, difficulties can result when multiple types of information are displayed simultaneously. Moreover, when in motion the operator may prefer that only certain information be displayed on the vehicle-mount computer such as, for example, navigation information or other information associated with a delivery or pick-up. Although a vehicle operator could potentially manually configure a vehicle-mount computer to display the desired information prior to placing the vehicle in motion, this is inefficient, particularly for vehicles that are continually picking up and delivering multiple items.

Therefore, a need exists for improved systems and methods for displaying information using a vehicle-mount computer so that information of interest selected by a driver will be automatically displayed during vehicle motion. More particularly, there exists a need for a system to obtain and store user-selected information on a vehicle-mount computer screen and automatically provide an easily-readable, zoomed view of the selected information when the vehicle is in motion.

SUMMARY

Accordingly, in one aspect, the present invention embraces a system for displaying information using a vehicle-mount computer, including a computer touch screen for inputting and displaying information, a motion detector for detecting vehicle motion, and a vehicle-mount computer in communication with the computer touch screen and the motion detector, the vehicle-mount computer including a central processing unit and memory. The vehicle-mount computer's central processing unit is configured to store information associated with user selected information from the computer touch screen, receive vehicle-motion information from the motion detector, and control the display of user-selected information on the computer touch screen in response to the motion detector's detection of motion.

In an exemplary embodiment, the user-selected information is within a user-selected area on the computer touch screen.

In another exemplary embodiment, the user-selected area is a rectangle.

In yet another exemplary embodiment, in response to the motion detector's detection of vehicle motion the vehicle-mount computer's central processing unit controls the display such that the aspect ratio of the user-selected area on the computer touch screen corresponds to the aspect ratio of the computer touch screen.

In yet another exemplary embodiment, the user-selected area is selected by a user on the computer touch screen.

In yet another exemplary embodiment, the configuration of the user-selected area is predetermined by the vehicle-mount computer.

In yet another exemplary embodiment, the vehicle-mount computer includes a network interface.

In yet another exemplary embodiment, the motion detector includes an accelerometer, a gps locator, a gyroscope, and/or a compass.

In yet another exemplary embodiment, the central processing unit is configured to execute application programs.

In yet another exemplary embodiment, the user-selected information displayed on the computer touch screen covers at least about 50% of the display area of the computer touch screen.

In yet another exemplary embodiment, the user-selected information includes navigation information.

In yet another exemplary embodiment, the user-selected information includes delivery information.

In yet another exemplary embodiment, the vehicle-mount computer's central processing unit is configured to continually determine whether the vehicle is in motion.

In yet another exemplary embodiment, the vehicle-mount computer's central processing unit displays the full amount of information from the computer touch screen if the motion detector indicates that the vehicle is not in motion.

In another aspect, the present invention embraces a method for displaying information using a vehicle-mount computer including selecting information on a computer touch screen of the vehicle-mount computer, monitoring vehicle motion with a motion detector, and after detecting vehicle motion, displaying a zoomed view of the user-selected information on the computer touch screen display.

In an exemplary embodiment, the user-selected information is within a user-selected area on the computer touch screen.

In another exemplary embodiment, the aspect ratio of the zoomed view of the user-selected area on the computer touch screen corresponds to the aspect ratio of the computer touch screen.

In yet another exemplary embodiment, the motion detector includes an accelerometer, a gps locator, a gyroscope, and/or compass.

In yet another exemplary embodiment, the configuration of the user-selected area is predetermined by the vehicle-mount computer.

In yet another aspect, the present invention embraces a method for displaying data using a vehicle-mount computer including selecting an area on a computer touch screen of the vehicle-mount computer, storing the selected area, monitoring vehicle motion with a motion detector, and after detecting vehicle motion, displaying information associated with the selected area on the computer touch screen when the vehicle is moving.

The foregoing, as well as other objectives and advantages of the invention, and the manner in which the same are accomplished, are further specified within the following detailed description and its accompanying drawings.

DETAILED DESCRIPTION

The present invention embraces systems and methods for displaying information. In particular, the present invention embraces systems and methods for displaying information using a vehicle-mount computer during vehicle motion.

In an exemplary embodiment, the system for displaying information using a vehicle-mount computer according to the present invention may include a vehicle-mount computer having a central processing unit, a system bus, a main memory, a mass storage device, an operating system stored on the mass storage device and executed by the central processing unit, and a computer touch screen for receiving input from a user and displaying information. The components of the vehicle-mount computer may be connected and in communication with each other by way of the system bus. The exemplary system also includes a motion detector connected to and in communication with the vehicle-mount computer.

In another exemplary embodiment, the method for displaying information using a vehicle-mount computer according to the present invention includes providing a vehicle-mount computer having a central processing unit, a system bus, a main memory, a mass storage device, an operating system stored on the mass storage device and executed by the central processing unit, and a computer touch screen for receiving input from a user and displaying information. The exemplary method according to the present invention further includes the steps of connecting a motion detector to the vehicle-mount computer and, upon the motion detector's detection of vehicle motion; the vehicle-mount computer's central processing unit displays a zoomed view of user-selected information on the computer touch screen.

Non-limiting examples of typical vehicles that may employ the system and method for displaying information using a vehicle-mount computer according to the present invention include forklifts, cranes, delivery truck, and similar industrial vehicles (e.g., vehicles used in industrial operations, factory or warehouse settings, and the like). References in the disclosure to particular types of vehicles are not intended to limit the disclosure to particular vehicles.

Figure 1:
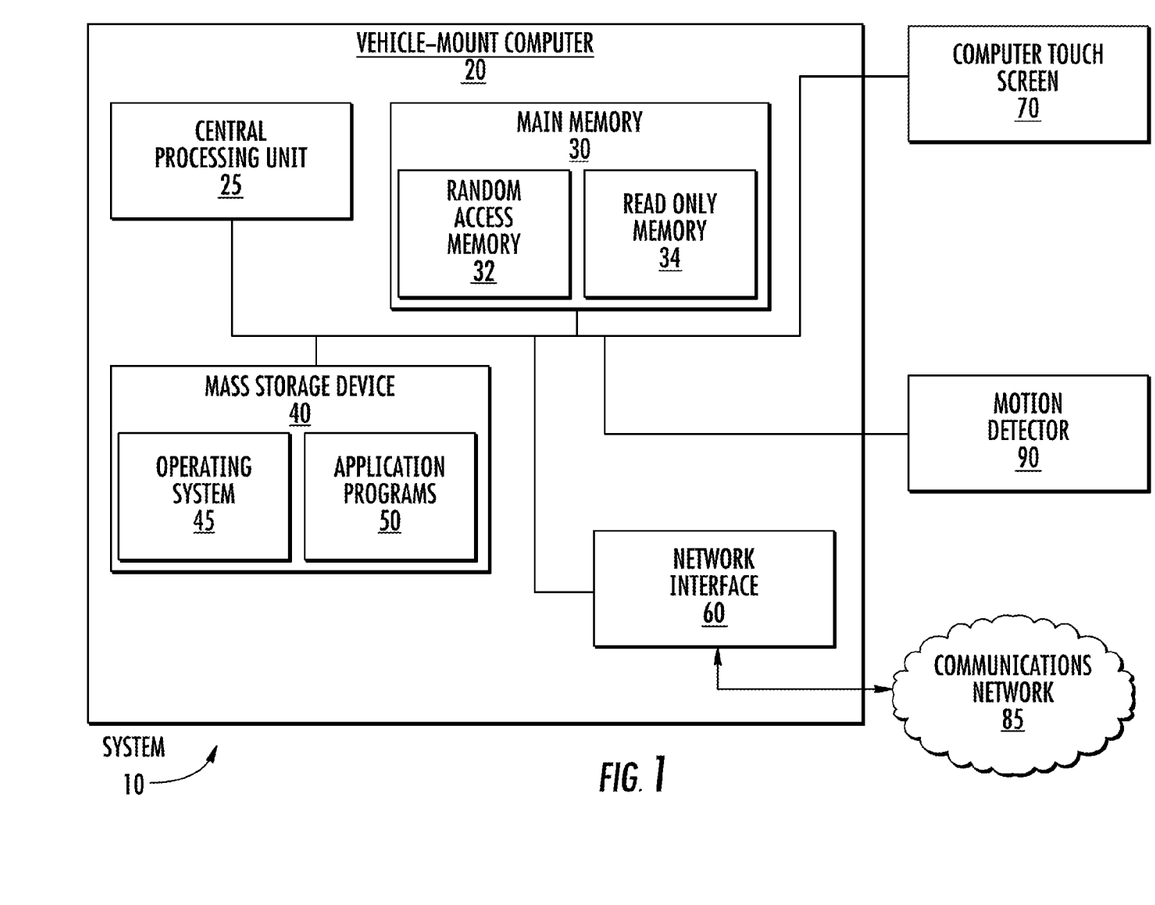
FIG. 1 is a schematic block diagram illustrating components for an exemplary system for displaying information using a vehicle-mount computer according to the present invention.

Referring now to the drawings, FIG. 1 is a schematic block diagram illustrating components of an exemplary system 10 for displaying information using a vehicle-mount computer. Vehicle-mount computer 20 includes a mass storage device 40 for storing an operating system 45 and various application programs 50. The mass storage device 40 may store other types of information as well.

As illustrated in FIG. 1, operating system 45 of the exemplary embodiment consists of software that controls the overall operation of the vehicle-mount computer 20, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, operating system 45 is loaded by booting the vehicle-mount computer 20 and is executed directly by the central processing unit 25.

Application programs 50 (FIG. 1) include any number of executable software programs designed to assist the vehicle operator in the performance of specific tasks. Application programs 50 may load automatically upon execution of operating system 45 or in response to an input from the vehicle operator.

Main memory 30 (FIG. 1) provides for storage of instructions and information directly accessible by central processing unit 25. Main memory 30 may be configured to include random-access memory 32 (RAM) and read-only memory 34 (ROM). The ROM 34 may permanently store firmware or a basic input/output system (BIOS), which provides first instructions to vehicle-mount computer 20 when it is booted. RAM 32 may serve as temporary and immediately accessible storage for operating system 45 and application programs 50.

Mass storage device 40 (FIG. 1) may be any of the various types of computer components capable of storing large amounts of data in a persisting (i.e., non-volatile) and machine-readable manner. Typically, mass storage device 40 may be a hard disk drive. Alternatively, mass storage device 40 may be a solid state drive, optical drive, removable flash drive or any other component with similar storage capabilities.

As illustrated in FIG. 1, computer touch screen 70 may be provided for inputting and displaying information using vehicle-mount computer 20. Computer touch screen 70 is operably connected to, and in communication with, vehicle-mount computer 20. Touch screen 70 may display information to users in the form of text or graphical output generated by vehicle-mount computer 20. Persons having skill in the art will appreciate that computer touch screen 70 may incorporate any appropriate touch screen technology having the ability to sense touch (e.g., resistive, capacitive, etc.) and that is conducive to the operating environment of the vehicle. Although touch screen 70 is illustrated in FIG. 1, other input devices (e.g., keyboard or mouse) or display devices may be utilized in connection with vehicle-mount computer 20.

As depicted in FIG. 1, an exemplary embodiment of the vehicle-mount computer 20 of the system 10 for displaying information using a vehicle-mount computer may also include network interface 60. Network interface 60 is operably connected to communications network 85, enabling vehicle-mount computer 20 to communicate with communications network 85. Communications network 65 may include any collection of computers or communication devices interconnected by communication channels. The communication channels may be wired or wireless. Examples of such communication networks include, without limitation, local area networks, the Internet, and cellular networks. The connection to the communications network 85 allows vehicle-mount computer 20 to communicate with other network nodes. For example, a central dispatcher could send instructions (e.g., a delivery schedule) from a scheduling server to the vehicle operator via the communications network 85.

Motion detector 90 (FIG. 1) may include any number of sensors or other appropriate devices that detect vehicle movement or potential vehicle movement. Motion detector 90 is operably connected to and in communication with vehicle-mount computer 20. Those having skill in the art will appreciate that any of a number of sensors may be utilized to detect vehicle movement including, but not limited to, an accelerometer, a gps locator, gyroscope, compass, or some appropriate combination of a number of sensors or devices. Sensors could also monitor potential vehicle movement, such as when the vehicle is placed into gear or otherwise made ready for movement by the user. As the term is used herein, vehicle motion specifically embraces the concept of actual motion as well as potential motion.

Central processing unit 25 is configured to store user-selected information from the computer touch screen 70. As illustrated in the exemplary embodiment (FIG. 1), the central processing unit 25 may execute application programs 50 to at least temporarily store information relating to a user-selected area, such as a rectangle, input from computer touch screen 70.

Figure 2:
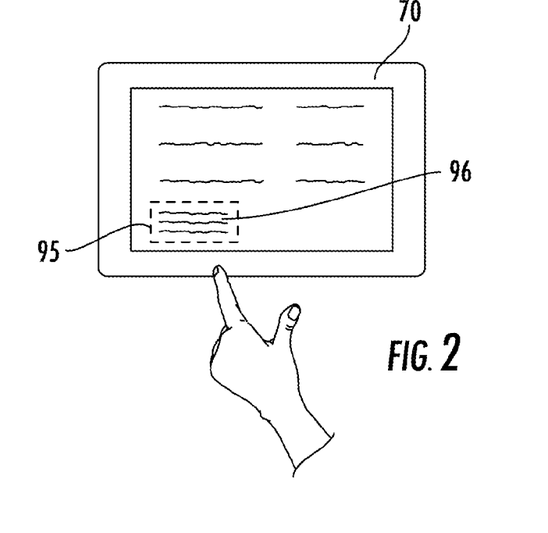
FIG. 2 illustrates an exemplary user-selected area and user-selected information from a computer touch screen according to the present invention.

As illustrated in FIG. 2, the vehicle-mount computer's 20 central processing unit 25, along with other components of system 10 such as application programs 50, may be configured to store user-selected information 96 associated with a user-selected area 95 from computer touch screen 70. Although the user-selected area 95 as depicted in FIG. 2 consists of a rectangle, the user-selected area 95 could consist of any configuration.

Figure 3:
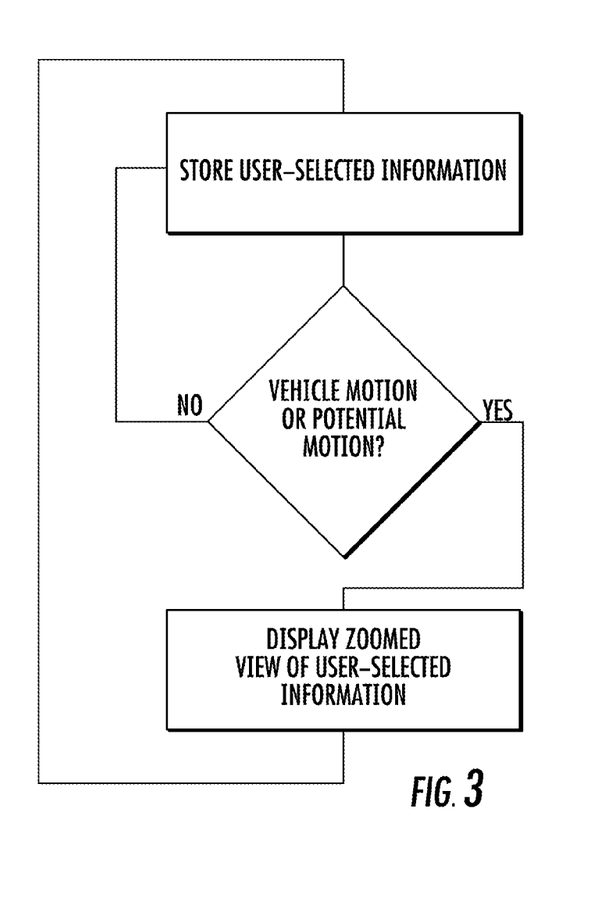
FIG. 3 illustrates the communication of certain elements of the exemplary embodiment for using a vehicle-mount computer according to the present invention.

FIG. 3 illustrates how certain of the above-described elements of the exemplary embodiment for displaying information using a vehicle-mount computer may communicate in order to display user-selected information. As set forth above, the vehicle-mount computer's 20 central processing unit 25 is configured to receive vehicle-motion information from motion detector 90. The vehicle-mount computer's 20 central processing unit 25 is configured to control the storage and display of a zoomed view 100 (FIG. 4) of the user-selected information 96 on the computer touch screen 70 in response to the motion detector's 70 detection of vehicle motion.

Figure 4:
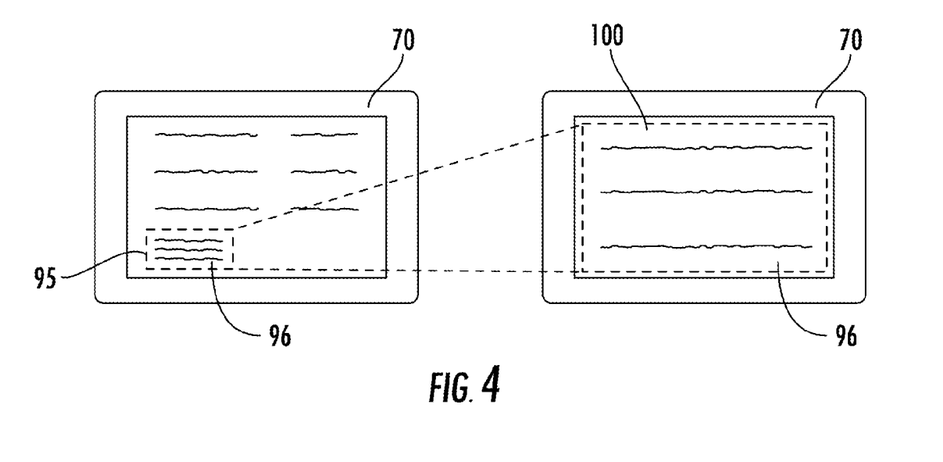
FIG. 4 depicts an exemplary user-selected area according to the present invention being displayed in a zoomed view on the vehicle-mount computer during vehicle motion or potential vehicle motion.

As illustrated in FIG. 4, the user-selected information 96 may include information on the computer touch screen 70 that the vehicle operator prefers to be displayed in a zoomed view 100 on the vehicle-mount computer 20 during vehicle motion. Such information may include, but is not limited to, navigation information, pick-up information related to an item, or other information related to a scheduled delivery. As set forth in FIG. 4 and described above, the user-selected information 96 within user-selected area 95 will be automatically displayed on the computer touch screen 70 during vehicle motion. More particularly, the user-selected information 96 will be automatically displayed in a zoomed view 100 (i.e., a magnified view) on the vehicle-mount computer 20 such that the user-selected information 96 is provided in a more easily-readable format when the vehicle is in motion.

In a non-limiting embodiment, the rectangle or other outline utilized for the user-selected area 95 may be configured such that the user-selected area 95 on the computer touch screen 70 corresponds to the aspect ratio of the computer touch screen 90 in order to facilitate display of the zoomed view 100.

To supplement the present disclosure, this application incorporates entirely by reference the following patents, patent application publications, and patent applications: U.S. Pat. Nos. 6,832,725; 7,159,783; 7,413,127; 8,390,909; 8,294,969; 8,408,469; 8,408,468; 8,381,979; 8,408,464; 8,317,105; 8,366,005; 8,424,768; 8,322,622; 8,371,507; 8,376,233; 8,457,013; 8,448,863; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400, 748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); and U.S. patent application Ser. No. 13/897,634 for a Laser Scanning Code Symbol Reading System Employing Programmable Decode Time-Window Filtering, filed May 20, 2013 (Wilz, Sr. et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for displaying information using a vehicle-mount computer, comprising:
   a computer touch screen for inputting and displaying information;
   a motion detector for detecting vehicle motion; and
   a vehicle-mount computer in communication with the computer touch screen and the motion detector, the vehicle-mount computer including a central processing unit and memory;
   wherein the vehicle-mount computer's central processing unit is configured to store information associated with user-selected information from the computer touch screen;
   wherein the vehicle-mount computer's central processing unit is configured to receive vehicle-motion information from the motion detector;
   wherein the vehicle-mount computer's central processing unit is configured to control the display of user-selected information on the computer touch screen in response to the motion detector's detection of motion;
   wherein the user-selected information is within a user-selected area on the computer touch screen; and
   wherein the configuration of the user-selected area is selected by a user on the computer touch screen.

2. The system of claim 1, wherein the user-selected area comprises a rectangle.

3. The system of claim 1, wherein in response to the motion detector's detection of vehicle motion the vehicle-mount computer's central processing unit is configured to control the display such that the aspect ratio of the user-selected area on the computer touch screen corresponds to the aspect ratio of the computer touch screen.

4. The system of claim 1, wherein the vehicle-mount computer comprises a network interface.

5. The system of claim 1, wherein the motion detector comprises an accelerometer, a gps locator, a gyroscope, and/or a compass.

6. The system of claim 1, wherein the central processing unit is configured to execute application programs.

7. The system of claim 1, wherein the user-selected information displayed on the computer touch screen covers at least about 50% of the display area of the computer touch screen.

8. The system of claim 1, wherein the user-selected information comprises navigation information.

9. The system of claim 1, wherein the user-selected information comprises delivery information.

10. The system of claim 1, wherein the vehicle-mount computer's central processing unit is configured to continually determine whether the vehicle is in motion.

11. The system of claim 1, wherein the vehicle-mount computer's central processing unit displays the full amount of information from the computer touch screen if the motion detector indicates that the vehicle is not in motion.

12. A method for displaying information using a vehicle-mount computer, comprising:
    selecting information on a computer touch screen of the vehicle-mount computer;
    monitoring vehicle motion with a motion detector; and
    after detecting vehicle motion, displaying a zoomed view of the user-selected information on the computer touch screen display;
    wherein the user-selected information is within a user-selected area on the computer touch screen; and
    wherein the configuration of the user-selected area is selected by a user on the computer touch screen.

13. The method of claim 12, wherein the aspect ratio of the zoomed view of the user-selected area on the computer touch screen corresponds to the aspect ratio of the computer touch screen.

14. The method of claim 12, wherein the motion detector comprises an accelerometer, a gps locator, a gyroscope, and/or compass.

15. A method for displaying data using a vehicle-mount computer comprising:
- selecting an area on a computer touch screen of the vehicle-mount computer;
- after selecting the area on the computer touch screen, storing the selected area;
- monitoring vehicle motion with a motion detector; and
- after detecting vehicle motion, displaying information associated with the selected area on the computer touch screen when the vehicle is moving.

* * * * *